United States Patent [19]
Carlström et al.

[11] Patent Number: 5,306,458
[45] Date of Patent: Apr. 26, 1994

[54] PROCESS FOR MANUFACTURING A PLASTIC PIPE

[75] Inventors: Börge Carlström, Oberwil; Ralph Jost, Füllinsdorf, both of Switzerland

[73] Assignee: Hobas Engineering AG, Basel, Switzerland

[21] Appl. No.: 964,766

[22] Filed: Oct. 22, 1992

[30] Foreign Application Priority Data

Oct. 23, 1991 [CH] Switzerland .................. 3095/91

[51] Int. Cl.⁵ .................. B28B 1/20; B29C 33/40
[52] U.S. Cl. .................. 264/255; 264/256; 264/310; 264/311; 264/337; 425/435
[58] Field of Search .............. 204/310, 311, 301, 302, 204/DIG. 60, 237, 348, 255, 256, 308, 337; 425/435, 429

[56] References Cited

U.S. PATENT DOCUMENTS

| Re. 25,587 | 6/1964 | Wiltshire | 264/311 X |
|---|---|---|---|
| 1,720,719 | 7/1929 | Casto | 264/311 |
| 2,278,858 | 4/1942 | Fields | 264/311 X |
| 2,826,869 | 3/1958 | Lerch | 264/311 X |
| 3,117,346 | 1/1964 | Bertin et al. | 264/310 X |
| 3,234,315 | 2/1966 | Blue et al. | 264/310 |
| 3,316,339 | 4/1967 | Breneman | 264/310 |
| 3,454,988 | 7/1969 | Cremer | 425/435 X |
| 3,574,245 | 4/1971 | Dohm | 425/435 X |
| 3,652,760 | 3/1972 | Petri | 264/310 |
| 3,663,682 | 5/1972 | Nitta et al. | 264/310 |
| 3,689,191 | 9/1972 | Westbrook et al. | 425/429 X |
| 3,754,852 | 8/1973 | Rempel | 425/429 |
| 4,043,721 | 8/1977 | Lemelson | 425/144 X |

FOREIGN PATENT DOCUMENTS

| 1296333 | 5/1969 | Fed. Rep. of Germany . | |
| 2217545 | 10/1973 | Fed. Rep. of Germany . | |
| 2016252 | 5/1970 | France . | |
| 6731 | 1/1982 | Japan | 264/40.6 |
| 404182 | 6/1966 | Switzerland . | |

*Primary Examiner*—Karen Aftergut
*Attorney, Agent, or Firm*—McGlew and Tuttle

[57] ABSTRACT

In a process known of per se for manufacturing plastic pipes, in which a liquid resin, a catalyst and sand and glass fibres are introduced into a centrifugal drum where the pipe is formed as the plastic sets, it was previously customary to start or stimulate the thermosetting process by blowing hot air into the centrifugal drum. The air escaping thereby from the inside of the drum contains solvent vapours which pollute the environment. The improved process consists in that the heat required to start the thermosetting process is no longer supplied from the inside by means of hot air, but by means of hot water which is sprayed onto the outside of the centrifugal drum and is fed through a hot water circuit and, after the exothermic thermosetting begins, heats up again in the latter to at least the original temperature, thereby drawing off heat released by the process. Further cooling is achieved by a cold water circuit, which can be switched on selectively to spray the centrifugal drum.

6 Claims, 2 Drawing Sheets

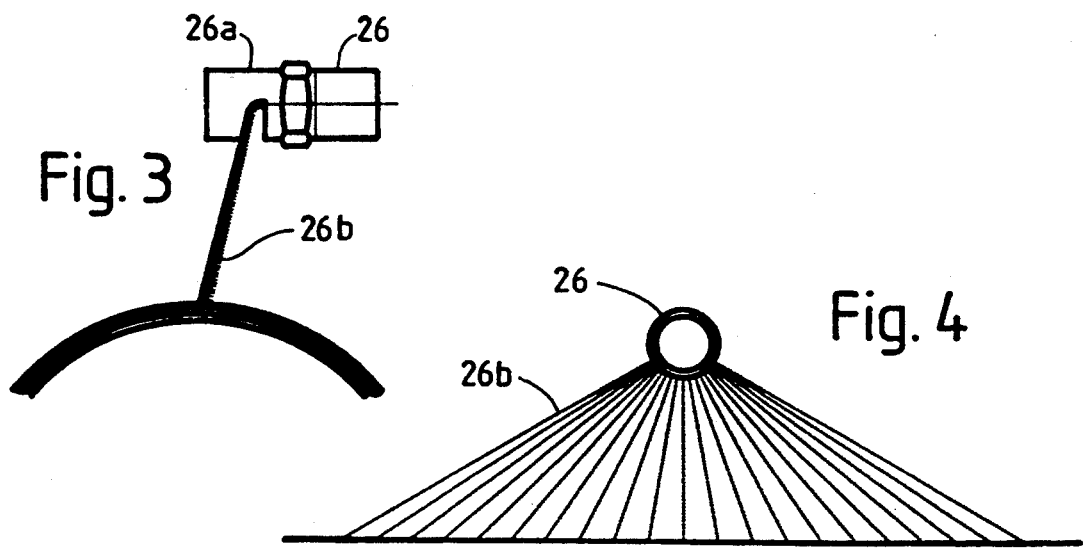
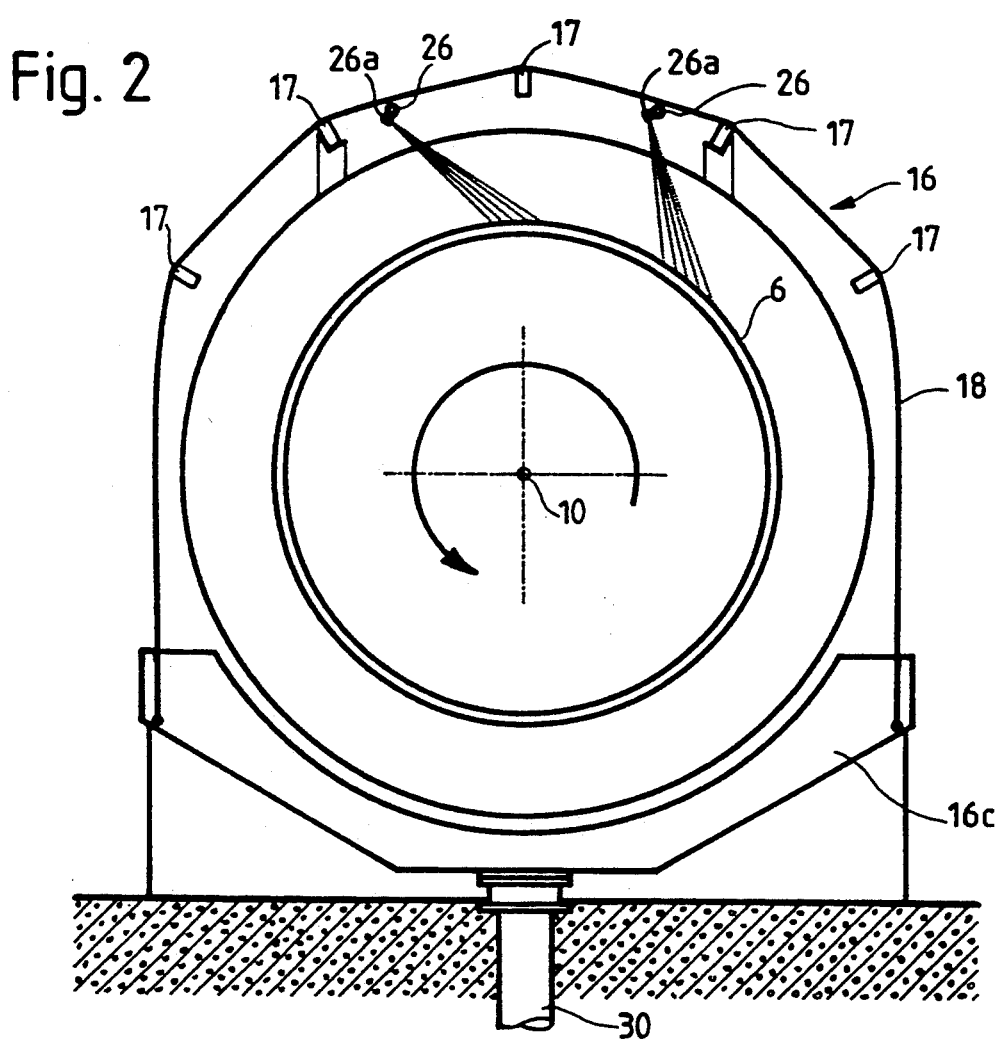

PROCESS FOR MANUFACTURING A PLASTIC PIPE

FIELD AND BACKGROUND OF THE INVENTION

The manufacture of plastic pipes from thermosetting plastic which may contain a filler, namely a polyester or epoxy resin mixed with calcium carbonate, for example, sand and glass fibres in a rotating, horizontally-axised metallic centrifugal drum serving as a mould, is known of per se. In installations of this type, the starting materials are distributed evenly from an arm moving to and fro in the centrifugal drum, and the composition of the wall of the pipe is formed according to the purpose for which it is intended, and in accordance with the dimensions it should have. Although the thermosetting reaction is an exothermic process, to ensure that the process runs correctly and predictably it is not only practical, but necessary, to supply heat after the first introduction of starting materials at room temperature into the centrifugal drum, which is also at room temperature. This is currently done by blowing hot air into the centrifugal drum. The air which is thereby blown out of the centrifugal drum carries gaseous solvents from the liquid resin or the catalyst, so that in accordance with new environmental findings and regulations, purification installations are required for this exhaust air.

SUMMARY AND OBJECTS OF THE INVENTION

The pipe manufacturing process according to the invention serves to solve this problem. In it, no purification of the air blown out is undertaken, rather a process is set forth whereby no air at all is blown in and neither, therefore, is any air blown out. An additional advantage is that heat is recovered so that the energy previously required to heat the air can be saved. This process according to the invention is namely characterized in that after the first introduction of starting materials into the centrifugal drum which is at room temperature, the latter is heated up to stimulate the per se exothermic thermosetting process by spraying from the outside with hot water fed through a circuit, until the thermosetting process becomes exothermic. When the temperature of the pipe being formed falls again, the centrifugal drum is cooled by means of cold water fed through a second circuit by spraying the centrifugal drum with this water in such a way that it at least partially evaporates. When this happens, the quantity of heat given up to the cold water circuit is at least as great as the quantity of heat extracted from the warm water circuit at the beginning of the manufacturing process.

The invention also concerns an installation for carrying out the process. Such an installation has at least one horizontally-axised, rotatably mounted, motor-driven metallic centrifugal drum serving as a mould for manufacturing pipes made essentially of duroplastic containing glass fibres, sand and possibly a filler, and a feed device for feeding these starting materials into the interior of the rotating centrifugal drum. It is characterized in that there is a heating and cooling installation with a hot water and a cold water circuit, as well as for each centrifugal drum, a housing encasing this centrifugal drum with a spray device disposed inside the housing for spraying the rotating centrifugal drum with water, and in addition, a suction device for the water vapour which forms in the housing, and a collecting device disposed below the centrifugal drum for the water running over the pipe, the spraying device and the collecting device being able to be connected to one of the two water circuits as required.

An embodiment of the invention will be described below, with reference to the enclosed drawings.

BRIEF DESCRIPTION OF THE DRAWINGS

In the drawings,

FIG. 2 shows a diagrammatic front view of a centrifugal drum on a larger scale, FIG. 3 shows a side elevation of a spray nozzle, and FIG. 4 shows a front view of the same nozzle.

DETAILED DESCRIPTION OF THE PREFERRED EMBODIMENT

Figure 1:
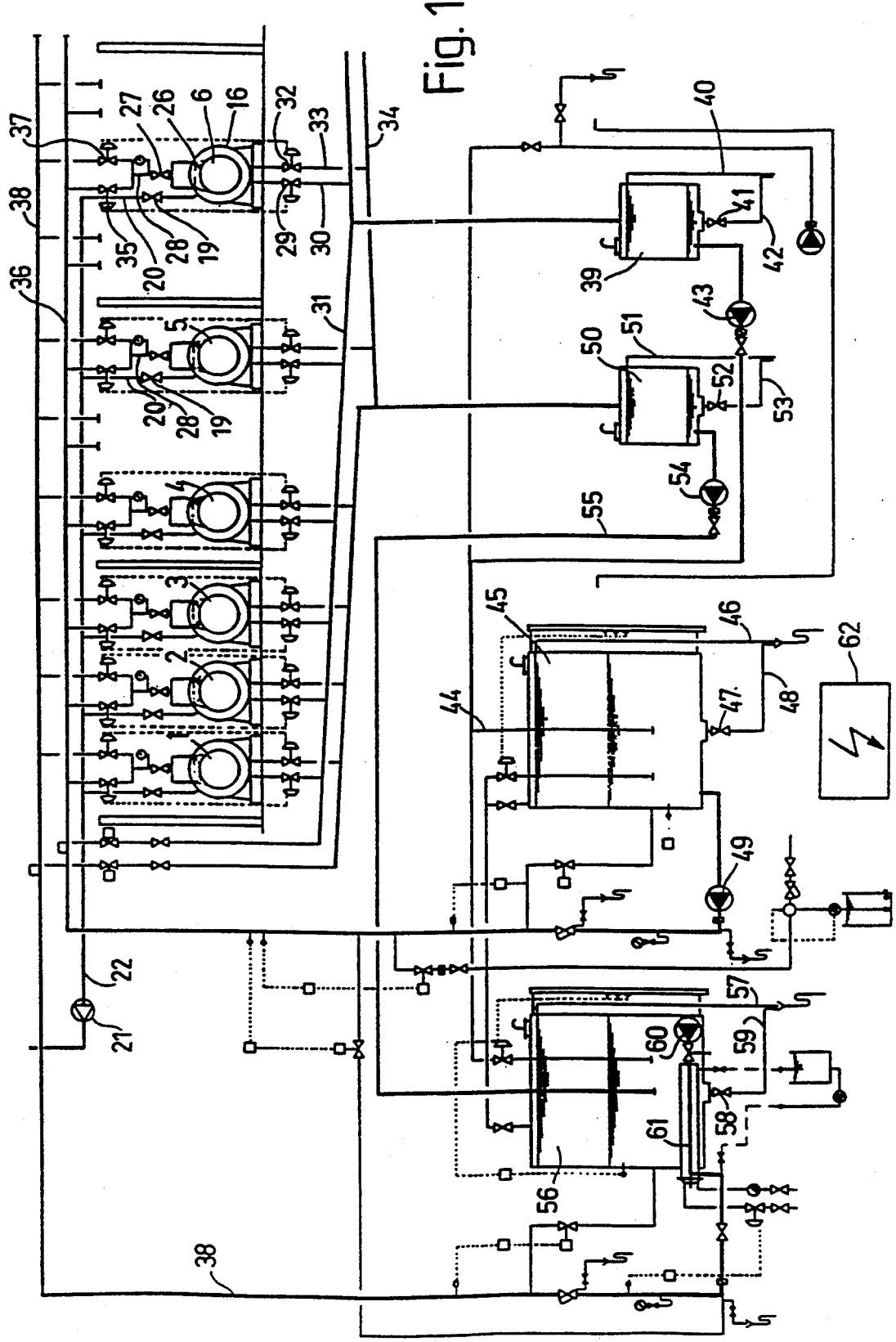
FIG. 1 shows a diagram of the principle of an installation according to the invention.

The installation shown in FIG. 1 has six horizontally-axised, rotatably mounted, motor-driven, metallic centrifugal drums which are only shown diagrammatically in the drawing and 7hich are designated by 1 to 6. Although these drums may all have different diameters, they are all shown in the drawing as being the same size for the sake of simplicity. To increase clarity, the complicated bearings of these drums and the drive elements, which are usefully electromotors with stepless speed variation, have not been drawn in.

However, as can be seen particularly well in FIG. 2, a jacket has been shown at each drum, which completely encases the centrifugal drum and which is designated by 16 in drum 6. As is evident from FIG. 2, this jacket can consist of a length of watertight fabric 18 drawn over five support rails designated by 17. Disposed at the top of this jacket are two spray pipes 26 fitted with spray nozzles 26a, which together form a spray device and which are connected with the inlet line 28 via a common valve 27. As can be seen in FIGS. 3 and 4, these spray nozzles 26a are designed in a manner known /f per se so that they produce a jet of spray 26b which essentially spreads out in a plane. They are disposed so that the plane of the jet of spray extends parallel to the axis 10 of the associated centrifugal drum 6. The inlet line 28 is connected via the electrovalve 35 with the cold water supply line 36 and with the hot water supply line 38 via electrovalve 37. The dimensions of the spray device, consisting of nozzles, supply lines and the pumps, are such that it can spray 250 to 400 liters of water per minute, depending on the diameter of the pipe. The lower part of the jacket 16, designated here by 16c, serves as a collecting device for the water running over the drum 6. This collecting device is connected via a run-off line 30 having an electrovalve 29, with the cold water collection line 31, and with the hot water collection line 34 via a run-off line 33 having an electrovalve 32.

The other five centrifugal drums 1-5 are each fitted in the same way with a spray device and a water collecting device and are connected to the cold water collection line 31, the hot water collection line 34, the cold water supply line 36 and the hot water supply line 38, so that no further description of these details shown in the drawings is necessary.

The cold water collection line 31 opens out into a first cold water reservoir 39, which is fitted with an overflow line 40 and a drainage line 42, which is closed by means of a valve 41. From the first cold water reservoir 39, a line 44 which is fitted with a pump 43, runs to a second cold water reservoir 45, which is larger than the first reservoir 39. This reservoir is also fitted with an overflow line 46 and a drainage line 48 closed by means of a valve 47. This second, larger cold water reservoir 45 is connected with the cold 7ater supply line 36 via a pump 49, so that all the aforementioned reservoirs, pumps and lines form a cold water circuit to which the spray device and the water collecting device can be connected via the corresponding valves 29 and 35.

Analogous thereto there is also a hot water circuit. The hot water collection line 34 opens out into a first hot water reservoir 50, which is fitted with an overflow line 51 and a drainage line 53 which is closed by means of a valve 52. From this first hot water reservoir 50, a line 55 fitted with a pump 54, runs to a second hot water reservoir 56, which is larger than the first reservoir 50. This second reservoir 56 is also fitted with an overflow line 57 and a drainage line 59 which is closed by means of a valve 58. This second, larger hot water reservoir 56 is connected with the hot water supply line 38 via a pump 60 and a heat exchanger 61, so that the two aforementioned reservoirs, the two pumps and the corresponding lines form a hot water circuit to which the spray devices and the water collecting devices can be connected via the corresponding valves 32 and 37.

As far as it is necessary, heat can be supplied by any means to the heat exchanger 61, by hot water or hot oil, for example. However, it could also be fitted with electrically heatable heating rods.

To evacuate the water vapour from the space between the mould 6 and the jacket 16, which forms when the cold water is sprayed onto the hot, rotating mould, there is a suction line 20 which may be closed by a valve 19, and which is connected to the main suction line 22 fitted with a fan 21, which blows the water vapour into the open air, although it would of course be possible to cool it off in a condenser.

Various other auxiliary and connection lines are shown in the drawings, some of which serve to fill the two circuits with water or to completely or partially drain them or to connect them to each other; others serve to short-circuit the circuits past the spray devices and the water collecting devices.

Naturally, not only are all the electrovalves connected via control lines (not illustrated in the drawings) with a central, programmable control device 62 (only illustrated diagrammatically in the drawings), the various temperature sensors and the level sensors on the reservoirs are also connected via corresponding lines to the control device so that the measured values can be read off there, the circuit being designed so that a circuit or alarm signal is triggered when critical values are not reached, or are exceeded. Furthermore, the controls for driving the centrifugal drums and the controls for the material supply are also connected to the programmable control device in such a way that the installation can be controlled from there both according to individual requirements, that is "by hand" so to speak, and according to preset programs.

In the process according to the invention for manufacturing a plastic pipe, the liquid resin, which may contain additives such as calcium carbonate for example, the corresponding catalyst and sand and glass fibres are introduced according to formulations known of per se, i.e. according to the required composition of the wall of the pipe to be manufactured, partially one after the other, partially together, into the rotating centrifugal drum, whereby, to achieve a smooth outer wall in the pipe to be manufactured, only resin and catalyst are introduced at first, then the glass fibres and the sand are subsequently introduced in such a way that they at least partially penetrate into the plastic, it normally being the case that a composition of several interlinked layers is formed.

In order to start or to accelerate the thermosetting process of the plastic introduced at room temperature into the centrifugal drum which is also at room temperature, it has previously been customary to blow hot air into the interior of the centrifugal drum.

Instead, according to the process of the invention in the installation described above, by opening the appropriate valves 32 and 37 and switching on the associated circulating pumps 51 and 60, the spray device and the water collecting device are switched into the hot water circuit. By means of the hot water, which has a temperature of 70° C., for example, and which is sprayed onto the outside of the centrifugal drum 6 and flows downwards over it, this drum is heated within ca. 90 sec. from 20° C. up to, for example, 60° to 70° C. Since it is made of metal, usually iron, and thus conducts heat well, the heat is supplied to the plastic. To prevent an outer portion of resin from thereby becoming so fluid before gelling that too high a concentration of glass fibres forms in it due to the migration of the glass fibres, which hinders thermosetting, a resin is used for the outermost wall portion whose gel time is only 10–70% of the gel time of the resin used for the innermost wall portions. At a mould temperature of 20° C. such a resin can thus have a gel time of 3 min. and at a mould temperature of 30° C. a gel time of 5 min., whilst the gel time of the resin used for the middle layers is three times as great and the gel time of the resin used for the inner layer is four to five times as great. This can be achieved by using a smaller proportion of inhibitor or by adding a greater quantity of accelerator. Due to the exothermic setting process which starts after gelling, the resin heats up to 80°–120° C., so that the centrifugal drum also heats up somewhat. As soon as the thermosetting process becomes exothermic, that is, at approximately the time when the mass of which the pipe being manufactured is formed reaches a temperature of ca. 70° C., or somewhat later, the spray device and the water collecting device are separated from the hot water circuit by closing the corresponding valves 37 and 32. When the temperature produced by the exothermic thermosetting resin falls again in the pipe, the cold water circuit, in which the temperature may lie at between 15° and 40° C., at 20° C. for example, is connected to the spray device and the water collecting device by opening the other valves 35 and 29, and the circulating pumps 43 and 49 are naturally also switched on. By means of this cooling, during which the cooling water can initially heat up to ca. 50° C., whereupon part of the cooling water evaporates, thereby extracting heat from the mould, the centrifugal drum is cooled down to a value between 50° C. and 20° C. within 5–10 min., depending on the temperature of the cold water.

When the material required for the pipe composition has been introduced and the resin has set, the plastic pipe can be withdrawn from the centrifugal drum without great expenditure of force since on the one hand, due to the new manner of heating and cooling, the inner diameter of the centrifugal drum is slightly bigger than the outer diameter of the hardened plastic pipe, and on the other hand, the temperature is constant over the entire length of the drum and the pipe. A further significant advantage lies in the fact that the heat produced during the exothermic thermosetting process can be used to start the thermosetting process of the next pipe, for which a heat pump is used, which pumps heat out of the cold water storage 45 into the hot water storage 56, but which is not illustrated in the drawings for the sake of better clarity. If no heat pump is used, heat must be supplied by the heat exchanger 61 to the water in the hot water circuit not only after a longer break in operations, depending on the insulation of the reservoirs of the hot water circuit, but also at other times. The water in the cold water circuit must then be kept cool or must be cooled in any manner known of per se, for example by means of a cooling device operating on the water evaporation principle.

The third advantage which can be achieved with the new process is that there is no environmental pollution. Furthermore, the question of cost should not be overlooked: the energy previously required to supply heated air is greater than the energy now required to operate the circulating pumps of the two water circuits, and the cost of installing the water circuits also lies within the bounds of what had to be spent for the hot air generators and fans, so that to summarize, despite a not insignificant reduction in operating costs, a significant increase in environmental benefits is achieved.

We claim:

1. A centrifugal casting process for manufacturing pipe, said process comprising the steps of:
   providing a centrifugal drum serving as a mold;
   introducing a first liquid thermosetting resin including glass fibers into said centrifugal drum to form an outermost wall portion of said pipe by centrifugal casting, said first liquid thermosetting resin having a gel time;
   introducing a second liquid thermosetting resin including glass fibers into said centrifugal drum to form an inner wall portion of said pipe by centrifugal casting, said second liquid thermosetting resin having a gel time, and said gel time of said first liquid thermosetting resin being 10% to 70% in length of said gel time of said second liquid thermosetting resin;
   spraying an outside surface of said centrifugal drum during said centrifugal casting of said pipe with hot fluid at a temperature higher than a temperature of said centrifugal drum in order to heat up said centrifugal drum and to stimulate a thermosetting process of said first and second thermosetting resins to become exothermic;
   stopping said spraying when said thermosetting process becomes exothermic; and
   spraying said centrifugal drum with cold fluid at a temperature lower than said temperature of said centrifugal drum when said temperature of said centrifugal drum starts to lower after said thermosetting process has become exothermic, said spraying of said cold fluid on said centrifugal drum causing a portion of said cold fluid to evaporate.

2. A process in accordance with claim 1, wherein:
   said first and second liquid thermosetting resins each include a filler, an appropriate catalyst, and sand.

3. A process in accordance with claim 1, wherein:
   said centrifugal drum is metallic.

4. A process in accordance with claim 1, wherein:
   said first liquid thermosetting resin, said second liquid thermosetting resin and said centrifugal drum are at room temperature prior to said steps of introducing.

5. A rotational molding process for manufacturing pipe, said process comprising the steps of:
   providing a centrifugal drum serving as a rotational mold;
   introducing a first liquid thermosetting resin into said centrifugal drum to form an outermost wall portion of said pipe by rotational molding, said first liquid thermosetting resin having a gel time;
   introducing a second liquid thermosetting resin into said centrifugal drum to form an inner wall portion of said pipe by rotational molding, said second liquid thermosetting resin having a gel time that is greater in length than said gel time of said first liquid thermosetting resin;
   spraying an outside surface of said centrifugal drum during said rotational molding of said pipe with hot fluid at a temperature higher than a temperature of said centrifugal drum in order to heat up said centrifugal drum and to stimulate a thermosetting process of said first and second thermosetting resins to become exothermic;
   stopping said spraying when said thermosetting process becomes exothermic; and
   spraying said centrifugal drum with cold fluid at a temperature lower than said temperature of said centrifugal drum when said temperature of said centrifugal drum starts to lower after said thermosetting process has become exothermic, said spraying of said cold fluid on said centrifugal drum causing a portion of said cold fluid to evaporate.

6. A process in accordance with claim 5, wherein:
   said first and second liquid thermosetting resins each include glass fibers.

* * * * *